United States Patent [19]

Magerman

[11] Patent Number: 5,214,599
[45] Date of Patent: May 25, 1993

[54] ADVANCED DIMENSIONAL PROCESSING WITH DIVISION

[76] Inventor: David M. Magerman, 7125 Mimosa Way, Tamarac, Fla. 33321

[21] Appl. No.: 368,487

[22] Filed: Jun. 19, 1989

Related U.S. Application Data

[63] Continuation-in-part of Ser. No. 943,424, Dec. 19, 1986, Pat. No. 4,841,473, and Ser. No. 328,929, Mar. 27, 1989, abandoned.

[51] Int. Cl.[5] ............................................. G06F 7/38
[52] U.S. Cl. .................................... 364/761; 364/754; 364/736; 364/753; 364/762; 364/DIG. 2; 364/923.5; 395/800
[58] Field of Search ............. 364/200, 900, 754, 755, 364/756, 757, 703, 705.01, 710.14, 724.03, 724.05, 336, 740, 741, 746, 750.9, 755, 760

[56] References Cited

U.S. PATENT DOCUMENTS

| | | | |
|---|---|---|---|
| 3,328,767 | 7/1967 | Ottaway | 364/736 |
| 3,733,477 | 5/1973 | Tate et al. | 364/767 |
| 3,761,698 | 9/1973 | Stephenson | 364/736 |
| 4,190,893 | 2/1980 | Gajski | 364/746 |
| 4,281,391 | 7/1981 | Huang | 364/746 |
| 4,313,174 | 1/1982 | White | 364/753 |
| 4,334,277 | 6/1982 | Bond et al. | 364/746 |
| 4,344,151 | 8/1982 | White | 364/754 |
| 4,366,549 | 12/1982 | Katayama | 364/746 |
| 4,538,238 | 8/1985 | Circello et al. | 364/746 |
| 4,566,075 | 1/1986 | Guttag | 364/756 |

Primary Examiner—David L. Clark
Assistant Examiner—John Loomis
Attorney, Agent, or Firm—Salzman & Levy

[57] ABSTRACT

The invention comprises a multi-dimensional array having an inverted, self-pruning binary tree architecture. The array is capable of doing comparative and computational tasks in one clock cycle of computer operation. The computational results of the invention will be free of rounding errors. Both multiplication and division is performed utilizing base ten modulus in a non-sequential operation.

20 Claims, 6 Drawing Sheets

ADVANCED DIMENSIONAL PROCESSING WITH DIVISION

RELATED APPLICATION

This application is a continuation-in-part of the parent, co-pending application Ser. No. 943,424; filed: Dec. 19, 1986, now U.S. Pat. No. 4,841,473 and Ser. No. 328,929; filed: Mar. 27, 1989 now abandoned.

The subject matter and teachings of the aforesaid parent applications are meant to be incorporated herein by way of reference.

FIELD OF THE INVENTION

The invention features an apparatus and method for performing comparative tasks and obtaining computational results utilizing a computer having an inverted, self-pruning binary tree architecture, and more particularly to an apparatus and method for performing mathematical operations that provide a result free of rounding errors, in one clock cycle.

BACKGROUND OF THE INVENTION

The parent application, Ser. No. 943,424; filed: Dec. 19, 1986, introduced a new element to the computer age, known as the "variable comparator" (VC). The VC is a powerful computing tool that allows for processing to be performed in a SINGLE CLOCK CYCLE of computing operations.

In the past, computational mathematics performed by computing machines have been done sequentially, generating partial sums throughout the process, and eventually arriving at a total, representing the sum of the partial sums. With this method of computation, an inherrent degree of inaccuracy results, from inconsistencies within the system known as: "rounding errors".

Another drawback of the standard computer processing is the amount of time required to perform sequential operations.

A multi-dimensional processing unit configured with VC's in accordance with this invention, eliminates both of these undesirable drawbacks of slow speed and inaccuracy.

Because the inventive system is unlimited in Buss size, numbers of any degree of precision may be handled by the system.

Computing machines in general perform two tasks: Data storage and retrieval; and Mathematical computation. Both of these tasks are performed internally by the computing machine in a format known as Binary. Binary is a number system based on the powers of the number two (2). Decimal arithematic, as performed long hand is done in Base ten (10) or powers thereof. Both methods essentially accomplish the same results. The internal element performing the tasks in the computer is an accumulator. When an accumulator adds a series of numbers, for example, 20 different terms, it adds two terms at one time, generating a partial sum which it then sums with the next term until all the terms have been added together. This sequential process is very rapid, being accomplished within millionths of a second or less. Comparison tasks are also sequentially performed. The comparison process is performed by the computer by its search through its memory for a particular item for which information has been requested. The memory may be a "card Index" type file similar to that in a library. Searching is usually done at a rate of 8 binary bits or one printed character at a time.

For example, a book title: Evolution of Man and Animals, being twenty-eight (28) characters long, will require the computer to execute twenty-eight sequential comparisons each time it find a title that is close to that being searched. Even with the computer's high rate of speed, this task can be time consumming.

The multi-dimensional processor (MDP) of this invention accomplishes the above tasks by comparing information or data on a single image plane, i.e. complete pages, titles, and mathematical operations all at once, in one clock cycle.

MDP sees the world in data images or snapshots of entire text, not single character methodology. For this reason, MDP has a built-in speed advantage that is thousands of times faster than conventional sequential machines.

MDP does not perform actual mathematical computations when executing mathematical operations, and it quite simply knows what the sum will be of any given numbers.

MDP does not use an accumulator, because it does not add or subtract. Rather, it simply outputs the right answer, based on the law that governs digits 0 through 9.

This "law" establishes the relationship of these digits 0 through 9 as having a given set of combinations or permutations. As such, MDP applies this 0 through 9 law to any given problem, and simultaneously provides an answer in a single clock cycle.

BRIEF SUMMARY OF THE INVENTION

The invention relates to a multi-dimensional array comprising an inverted, self-pruning binary tree architecture operative to provide a comparative or computational result in one clock cycle.

The array has a number of levels of variable comparators operatively connected in a series chain.

Information or data is introduced to a first level of variable comparators in the form of an image plane of mathematical operations or information. The computational result is free of rounding errors.

Each variable comparator comprises an EPROM.

It is an object of this invention to provide an improved multi-dimensional array featuring an inverted, self-pruning binary tree architecture.

It is another object of the invention to provide a computer architecture that will produce a comparative result in one clock cycle.

It is a further object of this invention to provide an apparatus and method for doing mathematical operations free of any rounding errors.

These and other objects of the invention will become more apparent and will be better understood with reference to the subsequent detailed description considered in conjunction with the accompanying drawings.

DETAILED DESCRIPTION OF THE INVENTION

Generally speaking, the invention pertains to an inverted, self-pruning binary tree architecture for performing comparative or computational tasks.

This invention utilizes the computer engine described in the aforementioned patent application, Ser. No. 943,424; filed: Dec. 19, 1986, and the teachings and subject matter of the parent application are intended to be incorporated herein by way of reference for the purposes of brevity.

Figure 1:
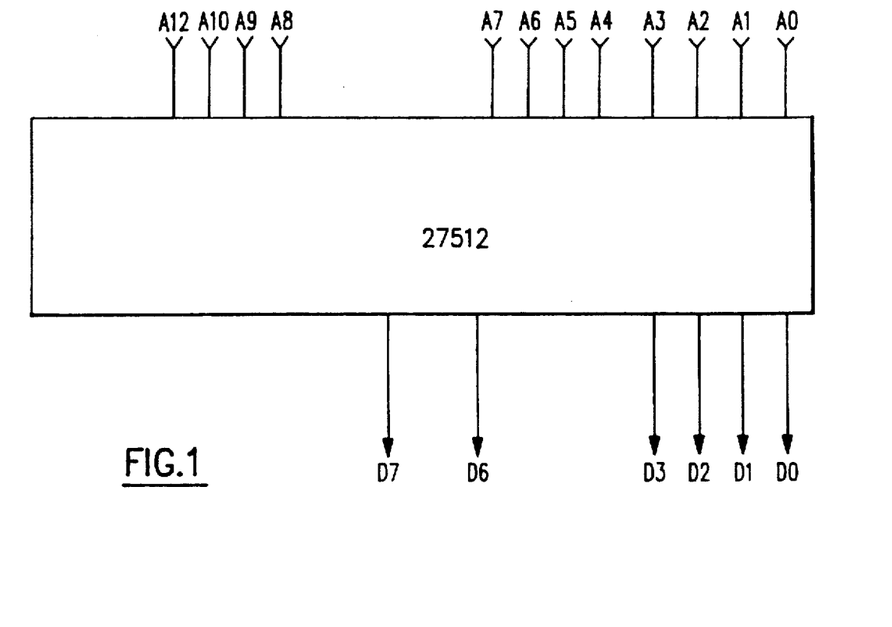
FIG. 1 illustrates a variable comparator EPROM, which is the basic building block of the architecture of this invention.
Figure 1A:
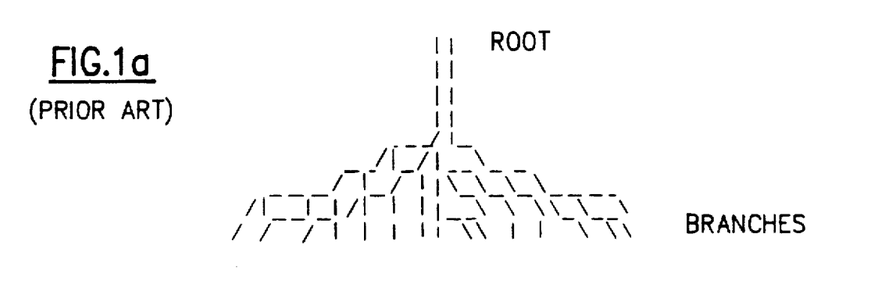
FIG. 1a illustrates in diagrammatic view a prior art binary tree computer structure.

Now referring to FIG. 1a, a view of the prior art binary tree architecture is shown.

Human though patterns are perceived in and of images. The though process is based on comparison of a new image against previous reference images stored in memory, with the brain functioning to interpret degrees of similarity between the two. Thus, new thoughts are tied to old truths.

A question at the root of the tree shown in FIG. 1a, is the input to a computer, and traverses through the different branches of the tree, with the answer emerging from one particular branch or pathway of the tree. This process is pushed to its limit by efficiencies in hardware and programming.

Figure 2:
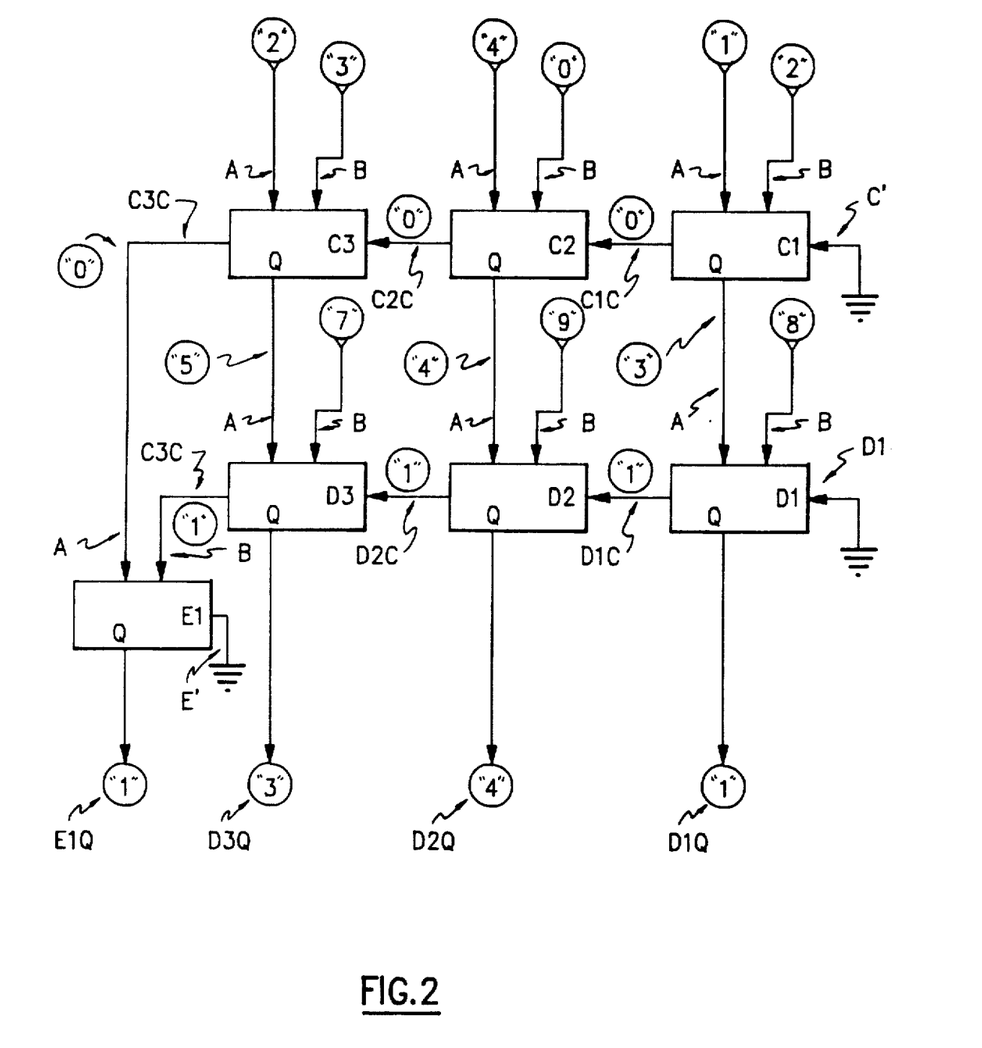
FIG. 2 shows a circuit diagram of the invention for performing mathematical operations.
Figure 2A:
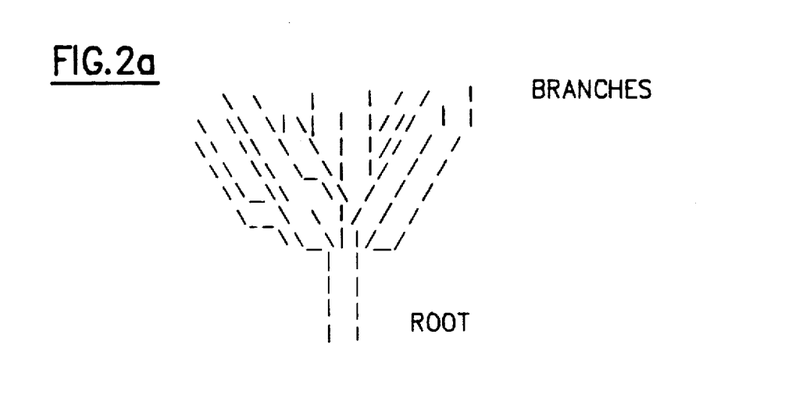
FIG. 2a depicts in diagramatic view the inverted, self-pruning binary tree architecture of the invention.

Now referring to FIG. 2a, the inverted, self-pruning binary tree of this invention, is illustrated. The question is input at the branches of this tree, and is preceived as a complete image. Each branch of the tree receives a small portion (one bit) of the question, and the answer emerges from the root of the tree in one clock cycle.

The rudiments of multi-dimensional processing are not new, but MDP of this invention introduces a new element, the variable comparator (VC). The VC's in multiple array are capable of rendering a degree of similarity in a comparison process strictly by virtue of the architecture. The percentages of that similarity are programmably flexible.

The result of the process can be comparative data imaging conceived in Hyper-Real time.

Consider for example, 16,384 bits of input data to be compared with the same number of reference data bits (not a limit). If the clock frequency of an MDP machine is one MegaHertz, one million images can be resolved in one second, and the machine is running at 1.4833 Trillion instructions per second.

The variable comparators (VC's) of the invention can be EPROM's 27512, as shown in FIG. 1. They can handle two types of program: (1) A video program compares each input bit with its reference bit, searching for the number of bits that equal each other in the image. A one bit level can be considered as video present, and the zero level as video absent. Each VC receives 16 bits and outputs 2 bits. (2) The second program applies to all secondary VC's that are not comparing pixels, but answer bits within the inner levels of the tree structure, which are received from the VC's output above them.

The answer bits are considered in pairs, with the following logic states:

| D0 | D1 | |
|---|---|---|
| 0 | 0 | match |
| 1 | 0 | no match |
| 0 | 1 | no match |
| 1 | 1 | match |

With the 2 bit answer resolution there are thus, four possible states, two mathcing states and two states that do not match. Connections from upper level to lower level VC's are made in "simple" mode:

UL D0/VC1→LL D15/VCN

UL D1/VC1→LL D14/VCN

UL D0/VC2→LL D13/VCN

UL D1/VC2→LL D12/VCN etc.

The terminology "simple" relates to the fact that the output answer pairs from the upper level VC's are connected in simple fashion to lower level VC inputs in Next-to-Neighbor configuration, there being no reason to split high and low bytes. Each lower VC is connected to eight pairs of outputs from the level directly above it. The secondary VC programming is such that it looks for the number of binary three's within its data input (three = 11 binary) and outputs two bits relating the percentage of three's within its input.

In a secondary VC with 16 bits of input, there are eight answer bit pairs present as input data to the VC. The logical possibilities for this pattern represent a maximum of 8 threes to a minimum of 0 threes, with conditions in between being 1 through 7 threes. The easiest resolution of this pattern would be to have as a secondary answer, the sum of the number of threes present at the VC's input. In order to keep the modulus the same throughout the tree, the same weighting as the primary VC's is applied to the secondary VC's:

8 out of 8 threes = output 3 [100%]

7 out of 8 threes = output 2 [87.5%]

6 out of 8 threes = output 1 [75%]

5 out of 8 threes = output 0 [62.5%]

less than 5 out of 8 threes = output 0 [<62.5%]

At the primary level, each VC has 8 pixels of input, therefore the number of pixels per line, divided by eight will equal the number of VC chips per line of video. VC's per line multiplied by the number of lines within the scan field will yield the total number of primary VC's needed.

The number of secondary VC's employed is computed as a function of the number of primary VC's used and the resulting number of answer bits generated by the primary VC's.

Each VC outputs two bits or wires, and each secondary VC consumes 16 bits or wires. The example below shows a scan field of 96 pixels per line and 100 lines:

96/8 - 12 PVC's per line

12 * 100 - 1200 PVC's @ Pri. Level
1200 * 2 - 2400 bits or wires

2400/16 - 150 SVC's @ level 1
150 * 2 - 300 wires from level 1

-continued

300/16 - 18.75 |19| SVC's @ level 2
19 * 2 - 38 wires from level 2

38/16 - 2.375 [3 VC's] @ level 3
3 * 2 - 6 wires from level 3 level 4 - 1 VC with FINAL TWO BIT OUTPUT.

TOTALS:
    1373 VC chips
    4 Secondary Levels
    173 total SECONDARY VC chips
    1200 PRIMARY VC chips The outputs at the root of the tree are available in one clock cycle.

It will be observed the dramatic reductions in both number of components per level and its attendant wiring is obtained as one proceeds downwardly through the tree.

Once past the high density of the first two levels, the remaining VC levels are easily constructed and managed.

Due to the high speed capabilities of the MDP system, data segmentation, a usual chore in programming standard computers, becomes unnecessary, and consequently, the programming for the inventive system is less complex.

The above example represents but a single dimension and it is quickly realized, that a multi-dimensional machine would provide an awesome power by present standards.

In calculating the throughput of an MDP system, comparison is made to a conventional computing apparatus. Given a typical video image composed of 96 lines of 96 pixels per line, the system requires 9,216 bits for each image.

A typical software approach would be to compare each bit for equality in sequence, and increment a SUM count to keep track of the number of bits that have equality. The SUM would then be divided by the total number of bits within the image to yield a percentage of bits that were equal to each other.

The following machine code might represent a typical algorythm for a 32 bit data bus of a conventional machine:

|            |                                  |                              |
|------------|----------------------------------|------------------------------|
|            | Load Sum #8                      |                              |
|            | Load wordcount #288              |                              |
| (nextword) | Load bitcount #32                |                              |
|            | Load Acc.A InputRam              |                              |
|            | Load Acc.B TemplateRam           |                              |
| (nextbit)  | RotateRightA                     |                              |
|            | BranchifCarrySet "ONE"           |                              |
|            | RotateRightB                     |                              |
|            | BranchifCarryClear "SUM"         | ;both bits — 0,add 1 to SUM  |
| (—bit)     | BitCount — BitCount —1           |                              |
|            | BranchifNotEqual "nextbit"       | ;32 bits Not done            |
|            | WordCount — Wordcount —1         | ;32 bits Are done            |
|            | BranchifNotEqual "nextword"      | ;288 Words Not done          |
| (done)     | Divide SUM by #9216              | ;image fully compared here   |
|            | Store at ANSWER Register         |                              |
|            | END                              |                              |
| (ONE)      | RotateRightB                     |                              |
|            | BranchifCarrySet "SUM"           |                              |
|            | Branch "—bit"                    |                              |
| (SUM)      | SUM — SUM +1                     |                              |
|            | Branch "—bit"                    |                              |

The above algorythm is seen to use 8 instructions per bit of each 32 bit word plus 3 times 200 instructions to fetch each new 32 bit word. The total number of instructions executed to fully compare the image is: 74592

$$(8 \times 32) \times 288 \quad (73728)$$
$$+$$
$$288 \times 3 \quad (864)$$
$$\text{total} \quad 74592 \quad \text{instructions}$$

If the conventional machine uses 8 clock cycles, as would a typical Motorola 68000 machine, then the conventional machine would take 596,736 clock cycles to compare two images to each other. If the conventional machine has a 12 MegaHertz clock, then it will compare 20 images per second. This machine would be said to be operating at 1.49 MIPS (Millions of instructions per second).

By contrast, a single dimension of an MDP system also operating with a 12 MegaHertz clock would compare 12 Million images in the same 1 second time frame, an increase in throughput of over $5 \times 10^5$ over the conventional machine.

Rated in software equivalents, MDP would execute at 17.8 TRIPS (Trillions of instructions per second).

A method of using variable comparator technology within the MDP system to perform mathematical calculation on both signed and unsigned numbers will now be discussed with reference to FIGS. 1 and 2. The method utilizes the same comparison techniques as discussed in the parent application, Ser. No. 943,424, with the exception that the variable comparator programming algorythms are mathematical in nature and based on the principle of four bit binary coded digits as applied to base ten.

Not only is greater speed achieved, but the method is free of any "rounding errors".

Example A below, represents a typical multiple addition and subtraction task that could be computed:

EXAMPLE A

```
  6253497831.0000350068
+    1035677.0000000001
-   10076200.0000045021
-         19.0000000033
+  811633214.1500000000
+       7893.0003400601
-   10030522.0946100322
-          .3145000211
+          .7073359644
-   99137612.0000000002
-      11899.7680361940
```

Example A consists of 4 additions and 6 subtractions in a disordered sequence.

An MDP system would solve this mathermatical problem in one clock cycle utilizing a ten dimsension, twenty digit array of variable comparators. There are eleven terms in the mathematical problem and a maximum of twenty digits in each term.

MDP enjoys an unlimited bus size, and therefore, can operate on an unlimited sized operand.

FIG. 1 illustrates an EPROM 27512 as the variable comparator, as aforementioned.

A0 through A3 are four address bits which serve as the "A term" input. A4 through A7 are four address bits which serve as the "B term" input. The "A term" and "B term" inputs each represent one binary coded decimal digit of four bits each. "A term" and "B term" have a modulus that extends from 0 through 9, represented by the four bit binary coded decimal bit pattern. A8 is an address bit that acts as the "Carry Input" from the next least significant digit within a group of EPROMs 27512, intended to process more than one digit. A9 is an address bit representing a two state control signal, which is either a logical one to perform an addition, or a logical zero to perform a subtraction. The state of this bit is dictated by the controlling means described in the parent application.

A10 is an address bit which is logical zero if the "A term" is a positive value, and a logical one if the "A term" is a negative value. A12 is an address bit which performs the same distinction for the "B term".

D0 through D3 are four output bits which will contain either the Sum of the "A term" plus the "B term", or conversely, the Subtraction of the "A term" minus the "B term".

D7 is the "Carry Output" from the device, which connects to the next highest significant digit to enable processing of more than one digit. D6 is the Sign bit of the output digit and represents a logical zero for a positive output and a logical one for a negative output. The Sign bit, like the "Carry Output" is connected to the next significant digit to enable processing of more than one digit.

All other address and data outputs are unused and tied to signal common.

Operation of the EPROM 27512 is described below:
The EPROM 27512, being a programmable device, can be programmed for all possible digit combination of addition and subtraction that appear on the "A term" and "B term" inputs, and "Carry" inputs to render an output and "Carry bit" consistent with addition and subtraction laws.

Since all preprogramming is limited to combinations of the digits zero through nine, and is relatively simplistic to those skilled in the art, it is herein void of explanation for brevity purposes.

Each table of answers, will be programmed to be one hundred addresses in length. One hundred addresses represents all the permutations of two digits that are between zero and nine.

There are a total of sixteen (16) tables programmed within the EPROM 27512, due to the fact that there are four input bits which will select which table is to be accessed, relative to the operation selected, i.e. either addition or subtraction.

Also selected will be the Sign of the "A term" and "B term" presented to the EPROM 27512, and finally the "Carry" input will require a table selection. Since these four "Operation Control Bits" are actually address bits, their value will determine which contiguous table of one hundred addresses will be accessed to generate an answer. The total number of bytes programmed will be sixteen hundred.

Once the EPROMs have each been programmed, they are connected to each other in chain-like fashion, as illustrated in FIG. 2. An N digit chain can be constructed to provide N digit processing. FIG. 2, however, is constructed with the capability to process an operation of three terms of three digits each, for the sake of explanation only.

The operation shown below in example B, requires the summation of three numbers (terms A, B and C, respectively):

EXAMPLE B

241 + 302 + 798 = 1341
(A) + (B) + (C)

Positive numbers were chosen to simplify the explanation. FIG. 2 depicts two, three digit dimensions consisting of C1 through C3 (dimension one), and D1 through D3 (dimension two) C1 and D1 represent the least significant digits and C3 and D3 represent the most significant digits in each dimension.

The digit inputs to the array are presented in image form as they are expressed in example B. C1 through C3 receive 241 and 302 for summation. D1 through D3 receive the sum of these two numbers (241+302) from C1 through C3 above, to which they add 798 (term C), inorder that the system will compute the total sum of 1,341.

The sum propagates from right to left through the system as does the "Carry's", C1C, C2C, C3C, D1C, D2C and D3C.

E1 provides Final "Carry Summation" to produce the fourth and most significant digit of the answer.

D' and D' are the "Carry Inputs" to the least significant digits in the "C" and "D" levels, and are tied to signal common as they are not used in the least significant digit position. For the purposes of clarity, all "A", "B" and "Q" signals have been reduced to single drawn lines on the figure, each line however, represents four bits or one binary coded decimal digit.

All of the events of the computation will take place simultaneously, but for the purpose of explanation, they will be hereinafter discussed in a sequential manner starting with variable comparator C1.

C1 has as its "A" input the number 1, and the number 2 as its "B" input. C1 will provide an output at C1Q which is equal to 3 (the sum of 1+2). Since a "Carry" is only produced when a sum exceeds nine, C1C will be equal to zero.

C2 will sum its "A" inputs of 34 and 0. C2Q will therefore be equal to 4. C2C will be zero, because there is no "Carry".

C3 will sum its "A" and "B" inputs of 2 and 3, producing 5 at output C3Q. C3C will be zero (no Carry).

Starting again at the next dimensional level, D1 will sum its "A" and "B" inputs of 3 and 8, producing a 1 at D1C, because of the "Carry" 1 produced in the sum of 11, and a 1 at D1Q.

D2 will sum its "A" and "B" inputs of 4 and 9 to provide 13 which is further added with the "Carry" 1 of D1C to produce a 4 at D2Q and a "Carry" 1 on D2C.

D3 will sum its "A" and "B" inputs of 7 and 5 to provide 12 which is further added with the "Carry" 1 D2C to produce 13, a 3 at D3Q and a "Carry" 1 at D3C.

The final event takes place at E1, the "Carry Summation Point". Since C3C is equal to zero and D3C is equal to 1, E1Q will have a value of 1, the sum of zero and one.

The total sum of the mathematical operation is represented by the outputs E1Q, D3Q, D2Q and D1Q, i.e. 1341.

The same principle of operation will also apply to decimal or fractional operations.

MDP can be designed with any configuration, modulus or dimensional level architecture of the designer's choice, and is therefore, free of most constraints of present day, conventional systems.

Figure 3:
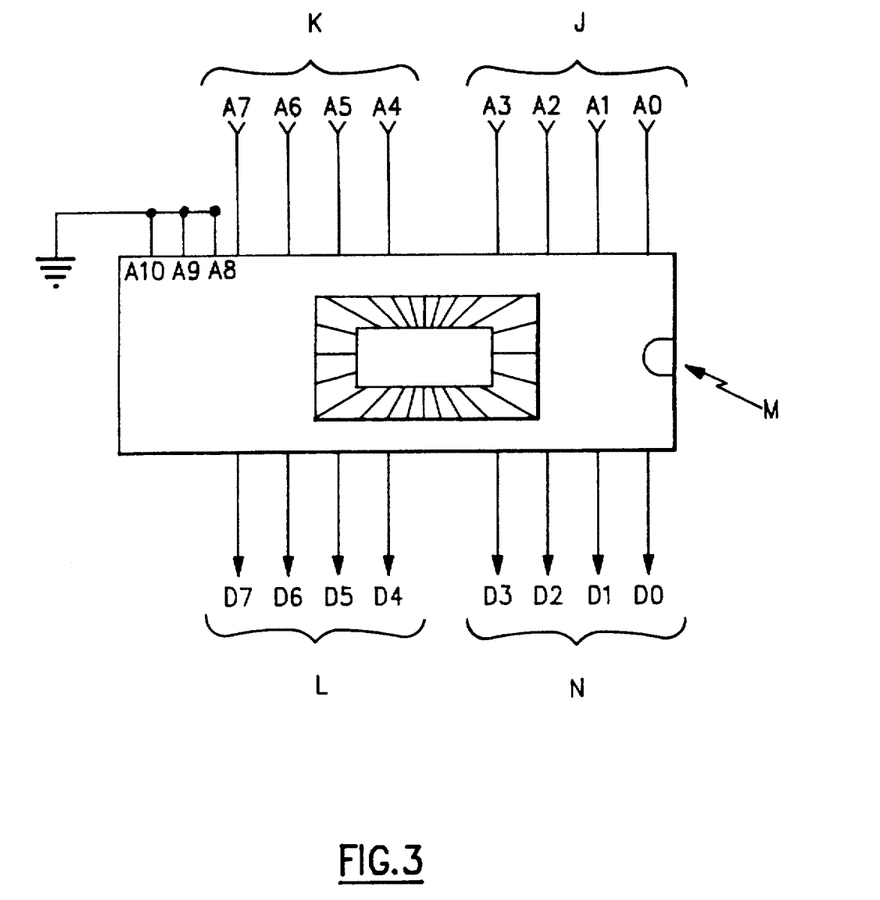
FIG. 3 depicts a variable comparator EPROM, which is configured to provide a multiplication operation.

Referring now to FIG. 3, a variable comparator M is shown in a configuration needed to provide a multiplication operation. Four address inputs A0, A1, A2 and A3 are depicted within bracket "J", and four address inputs A4, A5, A6 and A7 are depicted within bracket "K". Bracket "N" represents four data outputs D0, D1, D2 and D3, respectively, and bracket "L" represents four data outputs D4, D5, D6 and D7.

Address lines A8, A9 and A10 represent unused inputs that are tied to signal common.

The variable comparator M has the following program:

1. "J" will be the least significant digit of the multiplier.

2. "K" will be represent the least significant digit of the multiplicand.

3. "N" shall be the least significant digit of the product of "J" times "K".

4. "L" shall represent the most significant digit of the product of "J" times "K".

5. All 256 possible addresses represented by all the possible states of "J" and "K" are programmed to provide the correct product outputs of "J" x "K" at respective outputs "N" and "L".

6. All addresses that do not conform to binary coded decimal format have a zero output.

7. Since "J" and "K" inputs represent binary coded decimal digits (hereinafter BDC), each have ten possible valid BCD states. Therefore, the two terms "J" and "K" will provide one hundred valid BCD outputs, or $10^2$ outputs, the remainder of the 256 possible states being non-BDC or invalid states.

8. The largest product being 9×9, which equals 81, provides no carry, since 81 can be represented by two BCD digits.

9. Sign bits will not be necessary for the multipliers, because the sign of the "J" and "K" inputs will be resolved by subsequent levels of variable comparators configured as addition units, as will be explained hereinafter with reference to FIG. 4, which illustrates a typical multiplication architecture for a three by three digit multiplication. However, it is to be understood that any number of multiplication terms may be accommodated by the inventive architecture by increasing the length and depth of the variable comparator tree, as will become more aparent with reference to FIG. 4.

Figure 4:
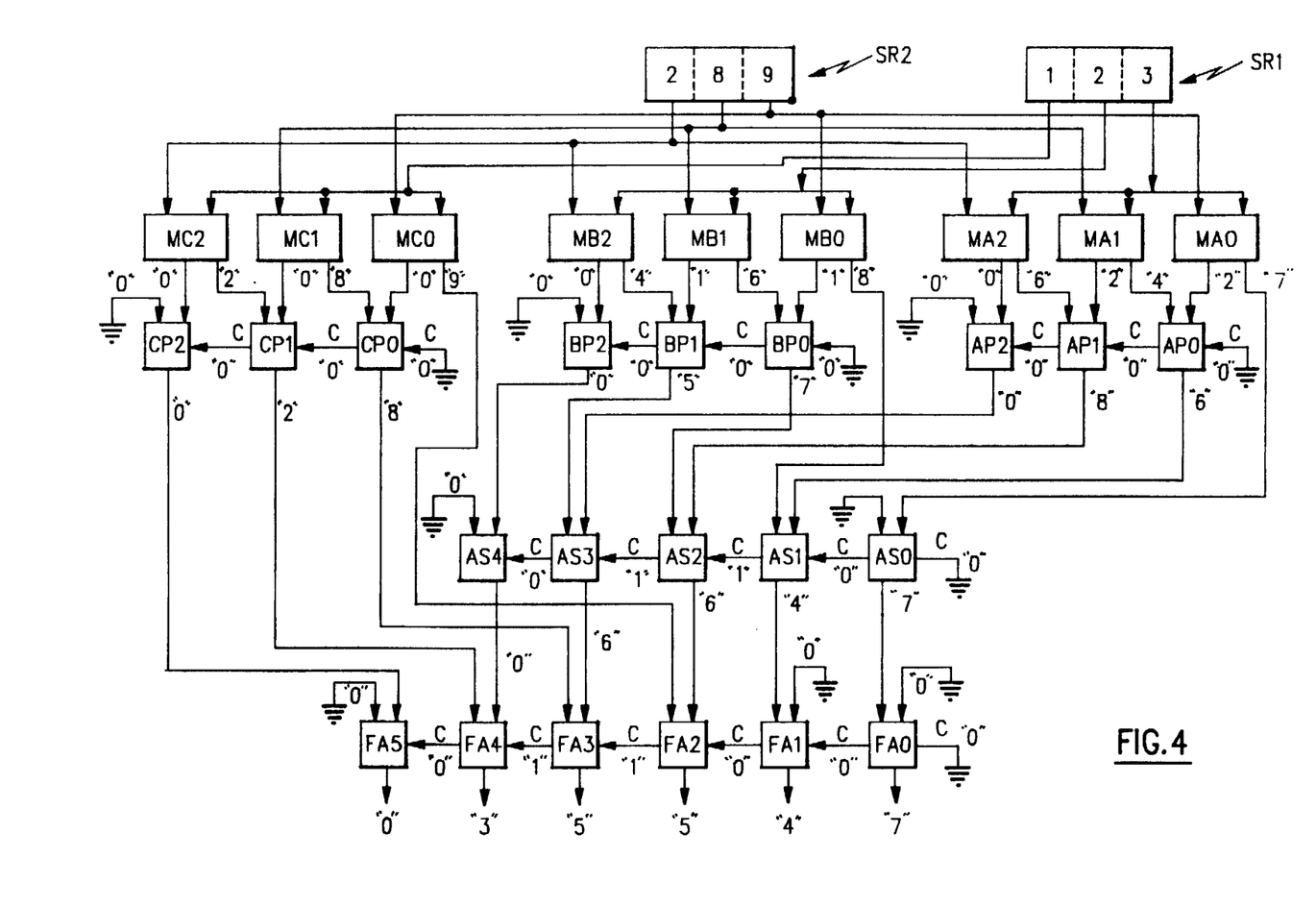
FIG. 4 is a circuit diagram of the invention for performing multiplication.

As aforementioned, FIG. 4 represents a bank of variable comparators having several levels, and arranged to provide a multiplication result for a 3 by 3 multiplication.

A sample multiplication of "289"×"123" has been chosen to illustrate the operation of the architecture, which will produce the correct result of "35547".

Three multiplier units MA0, MA1 and MA2, respectively are illustrated in the first row of the architecture as are two additional triads of multiplier units MB0, MB1 and MB2; and MC0, MC1 and MC2, respectively.

In the second level, there are three triads of adder units represented by AP0, AP1 and AP2; BP0, BP1 and BP2; and CP0, CP1 and CP2, respectively. These adder units are referred to as the primary level of adders.

A secondary level of adders are shown by units AS0, AS1, AS2, AS3 and AS4, respectively.

A final level of the tree is represented by adder units FA0, FA1, FA2, FA3, FA4 and FA5, respectively. This final level will provide the multiplication result in one clock cycle for the input sample chosen above.

Register SR2 is a 12 bit register holding the multiplicand term: "289". Register SR1 is likewise a 12 bit register containing the multiplier term: "123".

All the lines descending or vertically directed therefrom carry the equivalent of one BCD digit, and all lines shown horizontally between adder units represent carry bits bearing the designation "c", which are one bit wide.

The numbers illustrated in proximity to the lines are shown in quotes, such as: "8", represent instantaneous numerical outputs at that particular position within the tree architecture.

AP0, BP0, CP0, AS0 and FA0 are shown connected to signal common having a value of "0". This is so, because the least signigicant digit input carry of an adder unit is always zero.

One input to each unit AP2, BP2, CP2, AS0, AS4, FA0, FA1 and FA5, respectively, is connected to signal common, and is equal to zero. This causes automatic "power of Ten" justification during simultaneous multiply and addition operations, which are all occurring in one clock cycle.

The operations are very similar to longhand arithmetic performed by an individual using paper and pencil. The only difference being that the multiplication and addition of all the terms is accomplished simultaneously within one clock cycle.

The control means that loads SR1 and SR2 is illustrated in parent application, Ser. No. 943,424, as aforementioned.

All of the following events are occurring in the multiplication tree simultaneously:

A) MA0 sees at its input, 9 and 3, and outputs a 27.
B) MA1 sees at its input, 8 and 3, and outputs a 24.
C) MA2 sees at its input, 2 and 3, and outputs a 06.

These outputs will be fed to the subsequent levels of adder units, as will the outputs from multiplier units MB0, MB1 and MB2; and MC0, MC1 and MC2, respectively. The partial products emanate from the multiplication units to the various levels of adder units, as illustrated.

D) MB0 sees at its input, 9 and 2, and outputs 18.
E) MB1 sees at its input, 8 and 2, and provides product 16.
F) MB2 sees at its input, 2 and 2, and outputs product 04.
G) MC0 sees at its input, 9 and 1, and outputs 09.
H) MC1 sees at its input, 8 and 1, and provides 08.
I) MC2 sees at its input, 2 and 1, and outputs product 02.

All multiplication having now been completed, there remains only the addition of these partial products to obtain a result.

J) AP0 sees at its input, 4 and 2, and outputs sum 6 with no carry.
K) AP1 sees at its input, 6 and 2, and outputs sum 8 with no carry.
L) AP2 sees at its input, 0 and 0, and outputs 0 with no carry.
M) BP0 sees input 6 and 1, and outputs 7, no carry.
N) BP1 sees input 4 and 1, and outputs 5, no carry.
O) BP2 sees input 0 and 0, and outputs 8, with no carry.
P) CP0 sees input 8 and 0, and outputs sum 2, no carry.
(Q) CP1 sees input 2 and 0, and outputs sum 2, no carry.
R) CP2 sees input 0 and 0, and outputs sum 0 with no carry.

All primary level addition having been now completed, it now remains to place the addition of the partial products (sums) within their proper "Power of Ten" position or column. The absence of the "Carry" outputs at the primary level is a result of the largest addition being "8".

S) AS0 sees input 0 and 7, and outputs sum 7, no carry.
T) AS1 sees input 8 and 6, and outputs sum 4, carry 1.
U) AS2 sees input 7 and 8, and outputs sum 6 with a carry 1 (This is derived by $7+8+c=16$).
V) AS3 sees input 5 and 0, and carry 1, and outputs 6, no carry.
W) AS4 sees input 0, 0, and 0, and outputs sum 0, no carry.
X) FA0 sees input 7 and 0, and outputs sum 7, no carry.
Y) FA1 sees input 4 and 0, and outputs sum 4, no carry.
Z) FA2 sees input 0 and 6, and outputs sum 5, carry 1.
AA) FA3 sees inputs 8, 6 and 1, and outputs 5, carry 1.
BB) FA4 sees inputs 2, 0 and 1, and outputs 3, no carry.
CC) FA5 sees at its input 0 and 0, and outputs 0, no carry.

All the operations now having been complete, the answer or final result is displayed at the outputs of FA0 through FA4 as: "035547".

With the present architecture, logical shifts are possible either left or right resulting in division or multiplication by a factor of ten, respectively. Thus, reciprocals or percentage calculations are significantly made easier by the invention.

Figure 5:
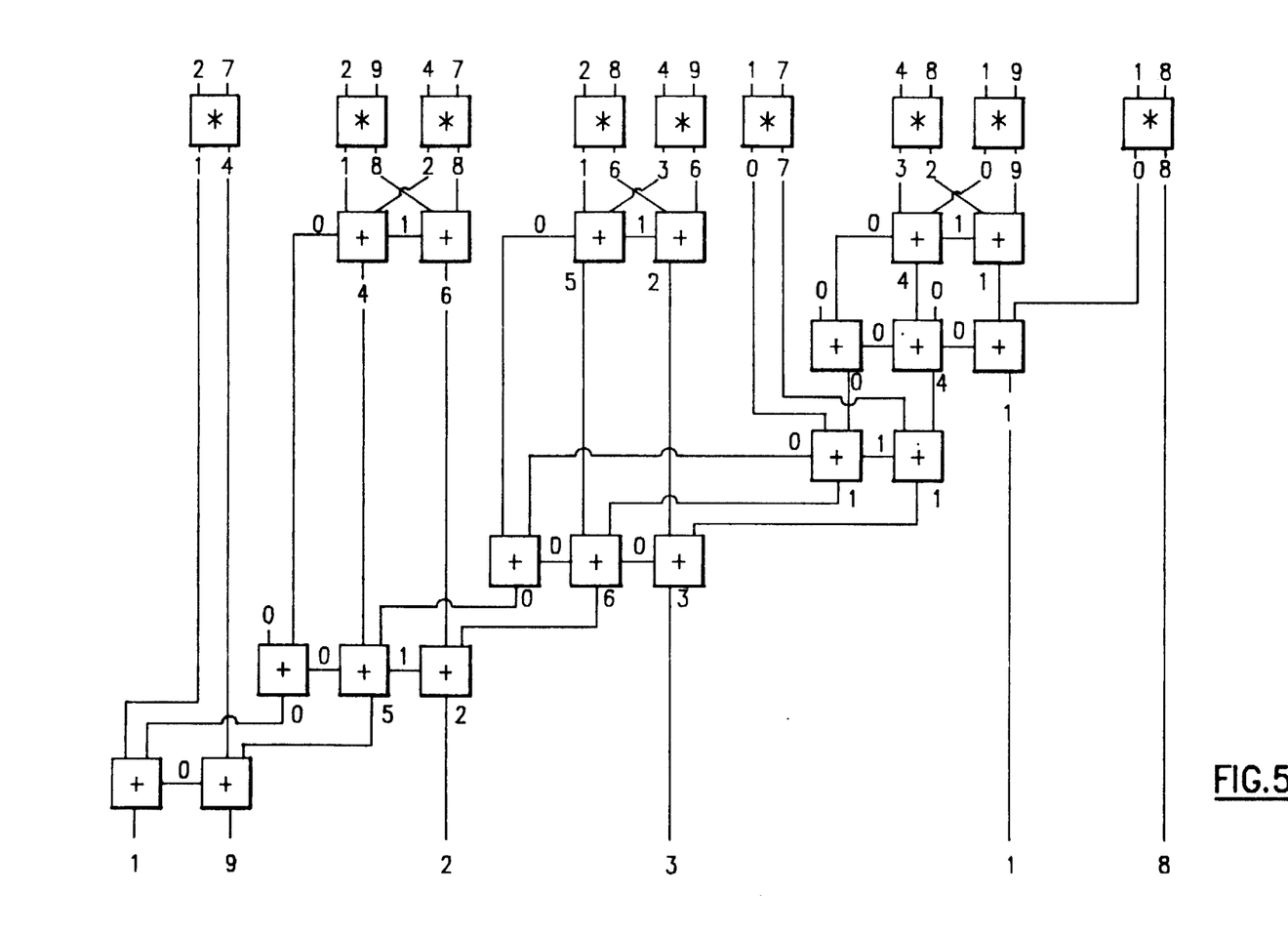
FIG. 5 illustrates an alternate embodiment of a computer array for performing multiplication utilizing a polynomial algorithm.

Referring now to FIG. 5, a multi-dimensional array is shown for performing multiplication for two 3-digit numbers utilizing an alternate process to that shown in FIG. 4. Like the circuit of FIG. 4, the first level of variable comparators uses EPROMS programmed with multiplication tables. These EPROMS are marked with "*". The subsequent levels of EPROMS are programmed with addition tables, and are marked with a "+".

Each group of sums produces two digits of overflow. Larger multiplicands will require more overflow digits, but this is easily handled and will not be shown here for the sake of brevity.

The array of FIG. 5 utilizes an algorithm to perform multiplication in accordance with the principles of advanced dimensional processing setforth previously herein.

The algorithm for multiplication is based on polynomial multiplication. Consider the product of two numbers, $241 \times 798$. This product is the same as:

$$(2 \times 10^2 + 4 \times 10^1 + 1 \times 10^0) \times (7 \times 10^2 + 9 \times 10^1 + 8 \times 10^0).$$

Writing the problem for "x", and expanding the following equation is obtained:

$$2 \times 7x^4 + 2 \times 9x^3 + 2 \times 8x^2 + 4 \times 7x^3 + 4 \times 9x^2 + 4 \times 8x^1 + 7x^2 + 8x^1 + 8x^0.$$

Since the process multiplies two second order multiplicands, the product is seen to be a fourth order multiplicand. The process must, therefore, determine the five coefficients of this product. This approach is not useful, however, since it is still necessary to group the results by powers of "x" and sum the coefficients in order to determine the five coefficients of the product.

A better approach is to proceed with one coefficient at a time, starting from the smallest to the highest. Consider the $x^0$ coefficient. The only terms which are relevant in determining the $x^0$ coefficient are $1 \cdot x^0$ and $8 \cdot x^0$. The result which is $8 \cdot x^0$ is conveniently a one digit result.

The $x^1$ coefficient is the sum of two products:

$$4 \cdot x^1 \cdot 8x^0 + 1 \cdot x^0 \cdot 9 \cdot x^1 = (32 + 9) \cdot x^1 = 41x^1.$$

The $x^2$ coefficient is slightly more complicated, being the sum of three products:

$$2 \cdot x^2 \cdot 8 \cdot x^0 + 4 \cdot x^1 \cdot 9 \cdot x^1 + 1 \cdot x^0 \cdot 7 \cdot x^2 = (16 + 36 + 7) \cdot x^2 = 59 \cdot x^2.$$

The $x^3$ coefficient is calculated as follows:

$$2 \cdot x^2 \cdot 9 \cdot x^1 + 4 \cdot x^1 \cdot 7 \cdot x^2 = (18 + 28) \cdot x^3 = 46x^3.$$

The $x^4$ coefficient is calculated as:

$$2 \cdot x^2 \cdot 7 \cdot x^2 = 14 \cdot x^4.$$

Thus, the result of the product is:

$$14x^4 + 46x^3 + 59x^2 + 41x^1 + 8x^0.$$

Since the original problem was merely to determine the result when x=10, then by substituting 10 for "x" and summing the terms provides the multiplication result.

The array of FIG. 5 deals with the following issues:
(a) grouping and summing the products to obtain each coefficient;
(b) providing for multiple digit carries; and
(c) providing for overflow.

The problem of grouping the products of digits by the power of the result is not a problem because the size of each multiplicand is known beforehand. Multiplying two 32-digit numbers, for example, would only require extra variable comparators to handle all of the sums of products of the coefficients.

The coefficients must also be reduced to single digits, with the remaining carry added to the higher order coefficients. This also will increase the number of variable comparators used.

The array in FIG. 5 demonstrates how the EPROMS are connected to calculate the product given the above process. The EPROMs take two 4-bit inputs, multiply the digits, and produce two 4-bit outputs, the two digits of the product. Thus, the EPROMs contain 10×10×8 table mapping inputs to outputs.

The multiplication level of variable comparators has intermediate results which are used to create the next level's result, while the subsequent addition EPROMs use a one-step lookup to produce the next level's result. The multiplication requires two digit outputs from its EPROMs, while the addition EPROMs require only one.

Figure 6:
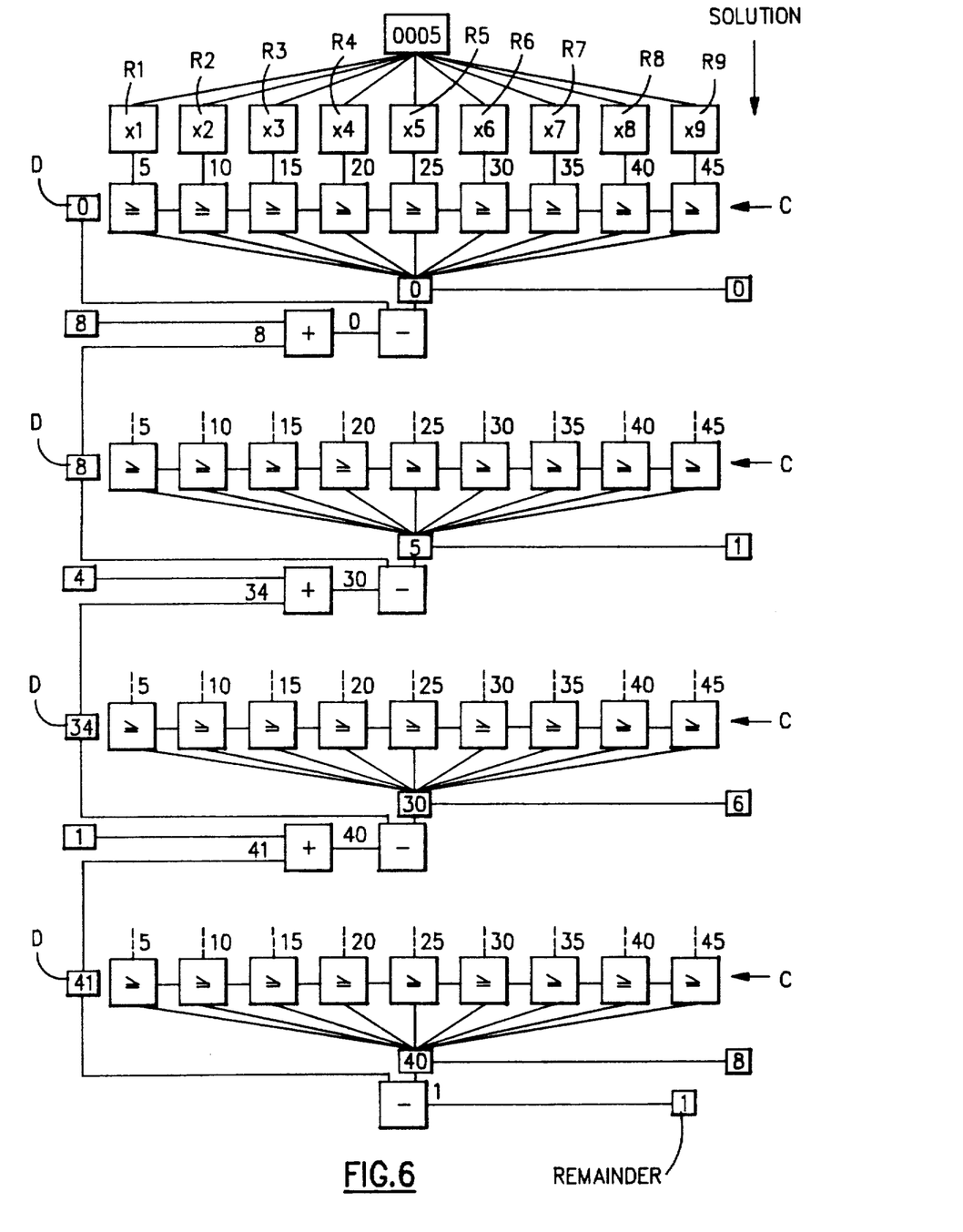
FIG. 6 shows a computer array for performing division utilizing a loop-oriented algorithm.

In order to perform division, reference is made to the dimensional array shown in FIG. 6.

Like the previously mentioned multiplication process, the division process of this invention is based upon an algorithm. The algorithm functions in a similar manner as individuals performing long division with paper and pencil.

Starting with a divisor and a dividend, division is accomplished by multiiplying the divisor by the digits 1 through 9, shifting and then subtracting the appropriate product from the dividend. Thus, inorder to process a divisional problem, the inventive method must start with these ten products.

The ten products are put into registers R0 through R9, respectively, with the index of each register corresponding to the digit which produced the product. The next step, is to start with the first digit of the dividend. The digit is put in Register D.

Comparing the Register D with the Registers R0 through R9, respectively, a register is selected which is less than or equal to Register D, but whose successor is greater than Register D.

Assume that is all the registers are less than Register D, then select Register R9.

The value of the chosen register will be subtracted from Register D, and the index of the register is noted. At this point, the value in Register D is multiplied by 10 (or shifted left one digit) and the next digit of the dividend is added to Register D.

The process is then repeated for each digit of the dividend.

The algorithm is presented as a loop-oriented algorithm, but can be performed as a sequence of steps within one clock cycle. The ten products within the Registers R0 through R9 can be calculated at the beginning of the circuit, and the comparators C, can be used at each of the "n" levels of the division process.

Each level will take as input, the remainder from the previous level and will use comparators and/or combinatorial logic to determine which of the ten products to subtract from that input to produce the output.

At the end of the nth level, there will be a concatenation of the indices which were used on each level, or the quotient, and the remainder of the dividend, which is the traditional remainder as in long division.

Since the inventive process deals with fixed size numbers and produces fixed precision values, the decimal place is easily determinable. It will always be in the same place, since the process pads the divisor and dividend with leading and trailing zeroes. In the case of a floating point system, additional logic will be required to determine the decimal's position.

An example is presented below to further explain the inventive process:

Working with 4-digit numbers, consider the problem 841÷5. The process pads these numbers to be 4-digits, producing the stated problem as: 0841÷0005. The padding of the divisor, however, is immaterial to the result.

First, generate the product registers:

```
R0 = 0005 × 0 = 0000  ←──╮
R1 = 0005 × 1 = 0005
R2 = 0005 × 2 = 0010      Register R0 has been
R3 = 0005 × 3 = 0015      deleted from FIG. 6
R4 = 0005 × 4 = 0020      because it is transparent
R5 = 0005 × 5 = 0025      to the process.
R6 = 0005 × 6 = 0030
R7 = 0005 × 7 = 0035
R8 = 0005 × 8 = 0040
R9 = 0005 × 9 = 0045
```

Comparison is now made between the first digit and each register, R0 through R9, respectively. This digit being "0", register R0 is equal to the input and R1 is greater than the input, wherefore, the first digit of the quotient is "0". Next, perform the trivial subtraction, 0−0, shift and add the next digit. Thus, the input to level two is 08.

Again compare the registers to the current input, and determine that Register R1 is equal or less than the input, and Register R2 is greater than the input value.

Thus, the second digit of the quotient is 1. The output of this level is 03, and the input to the next level is 034. Repeating the aforementioned process steps, the next digit in the quotient is determined as 6(30≦34<35) and the output of this level is 004. On the final level, the input is 0041, the final digit in the quotient is 8, and the remainder of this level and of the division itself is 1. Thus, the inventive process has determined in one clock cycle of computer operation, that the problem 0841÷0005 is equal to 0168 with a remainder of 1.

Having thus described the invention, what is desired to be protected by Letters Patent is presented by the subsequently appended claims.

What is claimed is:

1. A computer-type process of performing a mathematical computation or comparison in base ten utilizing a non-iterative operation, comprising the steps of:
(a) introducing data and information to a first level of a plurality of levels of comparators each of which are programmed to provide digit combination pairs of mathematical operations in base ten representing all digit combinations from zero to nine, such as $0+1, 0+2, \ldots 8+9,$ and $9+9$, said data and information being in a problem format;

(b) comparing at each succeeding level of comparators, outputs from an adjacent preceding level of comparators; and (c) obtaining a mathematical computation or comparative decision from a final level of comparators, said computation or comparative decision being obtained at a substantially equal time as that of the introduction of data and information to the first level of comparators inclusive of any propagational delays experienced within said plurality of levels of comparators as said computation or comparative decision works its way through the plurality of levels to provide a final result.

2. The method of claim 1, wherein said comparators comprise EPROMs.

3. The method of claim 1, wherein each level of comparators comprises a series chain of said comparators.

4. A computer array for obtaining a solution to a division problem utilizing a divisional, non-iterative operation, comprising register means defining a first level of interconnected registers and comparator means defining descending tiers of comparators operatively connected to said register means for performing said divisional operation utilizing a loop-oriented algorithm, and wherein said divisional operation is performed utilizing base ten modulus.

5. The computer array for obtaining a solution to a division problem utilizing a divisional, non-iterative operation in accordance with claim 4, wherein said array further comprises input means for providing an input from a previous tier of one of said tiers of comparators equivalent to a divisional remainder and wherein a subsequent tier of said tiers of comparators uses said divisional remainder to determine a product from one of ten products contained in said first level of registers and further comprising subtraction means operatively connected to said input means for subtracting the determined product from said input to produce an output, which output becomes a subsequent input to a further subsequent tier of said tiers of comparators of said array.

6. The computer array for obtaining a solution to a division problem utilizing a divisional, non-iterative operation in accordance with claim 5, said subtraction means comprises memory access units programmed with digit combinations of addition operations of all combinations from zero through nine encompassing $0+1, 0+2 \ldots 8+9,$ and $9+9$.

7. The computer array for obtaining a solution to a division problem utilizing a divisional, non-iterative operation in accordance with claim 5, wherein each tier of said tiers of comparators being operatively connected to said first level of registers comprising ten registers, each register containing one of said ten products.

8. The computer array for obtaining a solution to a division problem utilizing a divisional, non-iterative operation in accordance with claim 5, wherein said register means includes means for padding register products.

9. The computer array for obtaining a solution to a division problem utilizing a divisional, non-iterative operation in accordance with claim 8, wherein said shifting means shifts said value of said decumulating register by one digit to effect a multiplication of said value by ten.

10. The computer array for obtaining a solution to a division problem utilizing a divisional, non-iterative operation in accordance with claim 5, further comprising shifting means operatively disposed between each tier and connected to said register means and said subtraction means of each tier for shifting a register output to a subsequent tier of said tiers of comparators and wherein said subtraction means includes a decumulating register from which the determined product is subtracted, said decumulating register having a value that is shifted by said shifting means after said subtraction.

11. An inverted binary tree computer array comprising tiers of interconnected programmable memory access units programmed to provide digit combination pairs of mathematical operations in base ten encompassing all digit combinations from "0" to "9", and comprising a first level of interconnected memory access units and subsequent levels of interconnected memory access units including a final level of interconnected memory access units, said computer array solving a multiplication problem by having each digit in a multiplicand and multiplier of said multiplication problem each access one digit of a digit combination pair in one of said memory access units, input means operatively connected to said first level of interconnected memory access units for introducing said multiplication problem by feeding said digits of said multiplicand and multiplier to said first level of interconnected memory access units, and output means operatively connected to said final level of interconnected memory access units each of which obtains one digit of the product of said multiplicand and multiplier, and thereby provides an answer to said multiplication problem, each of said memory access units generally having means for receiving two inputs each of which represent a digit for accessing a digit combination pair of a plurality of digit combination pairs disposed therein, means for receiving carry-overs from adjacent memory access units which influence a digit result of the accessed digit combination pair, and means for providing a digit result, said inverted binary tree computer array being further characterized by providing a solution to said multiplication problem utilizing a non-iterative process resulting in a solution at said output means delayed in time from the introduction of said multiplication problem at said input means only by propagation delays through the levels of said interconnected memory access units.

12. The inverted binary tree computer array of claim 11, wherein said interconnected memory access units comprise EPROMs.

13. The inverted binary tree computer array of claim 12, wherein said first level of memory access units comprises EPROMs programmed with combinations of digit multiplicands and multipliers representing multiplication operations of "0" through "9" such as $0 \times 1$, $0 \times 2 \ldots 8 \times 9,$ and $9 \times 9$, and further wherein, subsequent levels comprise EPROMs programmed with combinations of digits performing addition operations of pairs of digit additions from "0" through "9", such as $0+1, 0+2 \ldots 8+9,$ and $9+9$.

14. The inverted binary tree computer array of claim 11, wherein said first level of memory access units are programmed to provide multiplication operations, and said subsequent levels of memory access units are programmed to provide addition operations, said multiplication and said addition operations all being in base ten.

15. An inverted binary tree computer array for obtaining a solution to a multiplication problem non-iteratively, comprising levels of programmable interconnected memory access units programmed to provide digit combinations of mathematical operations in base ten encompassing all digit combinations from zero to nine, a first level of said array interconnected to descending levels of memory access units, said first level of said array comprising memory access units programmed to provide multiplication combinations of digits zero through nine representing multiplicands and multipliers of all of said combinations, and subsequent levels of said array comprising memory access units programmed to provide addition combinations of all digit combinations of digits zero through nine, means operatively connected to said first level of memory access units for introducing a multiplication problem represented by digits of a multiplicand and multiplier, each digit of which is fed to said first level of memory access units, and means operatively connected to a final level of memory access units for obtaining a solution to said multiplication problem, each final level of memory access units providing a digit of said solution to said multiplication problem.

16. The inverted binary tree computer array of claim 15, wherein said multiplication combinations are provided by a polynomial algorithm in base ten modulus.

17. A computer architecture for providing a comparative or computational result utilizing a base ten, non-iterative mathematical operation, comprising:

a first means defining a first level of comparators each programmed to provide digit combinations of mathematical operations in base ten representing all digit combination pairs from zero to nine, each operatively connected to a second means defining at least a second level of comparators each programmed to provide digit combinations of mathematical operations in base ten representing all digit combination pairs from zero to nine, said first means receiving an input representing a mathematical problem represented by digits of an operator and an operand to be fed to said comparators through descending levels thereof, wherein said digits of said operator and operand will access digit combinations disposed in said comparators to generate subsequent digit results until said mathematical problem is solved, and said second means generating an output indicative of a comparative or computational result representing a final digit output.

18. The computer architecture of claim 17, wherein said comparators comprise EPROMs.

19. The computer architecture of claim 17, wherein said comparators in each level are operatively connected in a series chain.

20. The computer architecture of claim 17, wherein said first level of comparators provide multiplication operations, and subsequent levels of said comparators provide addition operations.

* * * * *